United States Patent
Brecl

(10) Patent No.: US 11,115,435 B2
(45) Date of Patent: Sep. 7, 2021

(54) LOCAL DDOS MITIGATION ANNOUNCEMENTS IN A TELECOMMUNICATIONS NETWORK

(71) Applicant: Level 3 Communications, LLC, Broomfield, CO (US)

(72) Inventor: Peter Brecl, Highlands Ranch, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 114 days.

(21) Appl. No.: 15/998,457

(22) Filed: Aug. 15, 2018

(65) Prior Publication Data

US 2019/0058729 A1 Feb. 21, 2019

Related U.S. Application Data

(60) Provisional application No. 62/545,837, filed on Aug. 15, 2017.

(51) Int. Cl.
*H04L 29/06* (2006.01)

(52) U.S. Cl.
CPC ...... *H04L 63/1458* (2013.01); *H04L 63/0236* (2013.01); *H04L 63/20* (2013.01)

(58) Field of Classification Search
CPC .. H04L 63/20; H04L 63/1458; H04L 63/0236
See application file for complete search history.

(56) References Cited

U.S. PATENT DOCUMENTS

| | | | | |
|---|---|---|---|---|
| 2007/0143851 A1* | 6/2007 | Nicodemus | ......... | H04L 63/1433 726/25 |
| 2012/0134368 A1* | 5/2012 | Asati | ...................... | H04L 45/00 370/401 |
| 2012/0284516 A1* | 11/2012 | Errico | ..................... | G06F 21/32 713/168 |
| 2013/0152214 A1* | 6/2013 | Jackson | .............. | H04L 63/1458 726/26 |
| 2015/0326589 A1* | 11/2015 | Smith | ................... | H04L 63/145 726/1 |
| 2016/0092485 A1* | 3/2016 | Lamas | ................ | G06F 16/2477 707/746 |
| 2018/0013787 A1* | 1/2018 | Jiang | ....................... | H04L 43/16 |
| 2018/0109553 A1* | 4/2018 | Radlein | .............. | H04L 63/1441 |

* cited by examiner

*Primary Examiner* — Jeffrey C Pwu
*Assistant Examiner* — Rodman Alexander Mahmoudi

(57) ABSTRACT

Implementations described and claimed herein provide systems and methods for mitigating network threats. In one implementation, a provider edge device of a telecommunications network is configured to accept distributed denial of service mitigation rule propagation from a customer edge device of a customer network in communication with the provider edge device. A distributed denial of service mitigation rule for the customer network is received at the provider edge device from the customer edge device. The distributed denial of service mitigation rule includes one or more routing parameters and a mitigation action. The distributed denial of service mitigation rule is implemented locally on the provider edge device of the telecommunications network. A broadcasting of the distributed denial of service mitigation rule in the telecommunications network is prevented beyond the provider edge device.

20 Claims, 5 Drawing Sheets

LOCAL DDOS MITIGATION ANNOUNCEMENTS IN A TELECOMMUNICATIONS NETWORK

CROSS REFERENCE TO RELATED APPLICATION

The present application claims priority under 35 U.S.C. § 119(e) to U.S. Provisional Patent Application No. 62/545,837, entitled "Local DDOS Mitigation Announcements in a Telecommunications Network" and filed on Aug. 15, 2017, which is specifically incorporated herein in its entirety.

TECHNICAL FIELD

Aspects of the present disclosure relate to systems and methods for mitigating network threats and more particularly to receiving one or more distributed denial of service mitigation rules from a customer network and implementing the received rules on an edge device to a telecommunications network.

BACKGROUND

Computing devices, including laptops and smartphones, connected to the Internet or other networks are generally confronted by interminable security risks. For example, the Internet is plagued by numerous malicious actors utilizing various forms of malware to damage or disable computing devices or systems, steal data, interrupt communications, extort businesses or individuals, and/or steal money, among other nefarious acts. One such act is a denial of service (DOS) attack that is attempt to make content servers or other resources of a content provider unavailable to legitimate users. In general, such attacks include flooding a content server or other type of application server with phony requests for information from the content server at such a frequency to impede other legitimate traffic or requests from being fulfilled by the content server. A distributed denial of service (DDOS) attack is similar except that the requests for the content are received from more than one, often thousands, of unique Internet Protocol (IP) addresses. Such attacks may negatively impact the ability to provide content to legitimate requesters of content or information.

To thwart such attacks, DDOS mitigation rules are broadcast and propagated to every component of a network to disperse the defense against the attack throughout the network. However, as some telecommunication networks may provide services to thousands of customers, such networks may prevent announced DDOS mitigation rules from a customer network to be broadcast throughout the telecommunications network, as such rules would quickly overwhelm the devices of the network. On the other hand, stopping the implementation of the DDOS mitigation rules for a customer network at a network edge reduces the dispersal of the DDOS attack defense. It is with these observations in mind, among others, that various aspects of the present disclosure were conceived and developed.

SUMMARY

Implementations described and claimed herein address the foregoing problems by providing systems and methods for mitigating network threats. In one implementation, a provider edge device of a telecommunications network is configured to accept distributed denial of service mitigation rule propagation from a customer edge device of a customer network in communication with the provider edge device. A distributed denial of service mitigation rule for the customer network is received at the provider edge device from the customer edge device. The distributed denial of service mitigation rule includes one or more routing parameters and a mitigation action. The distributed denial of service mitigation rule is implemented locally on the provider edge device of the telecommunications network. A broadcasting of the distributed denial of service mitigation rule in the telecommunications network is prevented beyond the provider edge device.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Figure 1:
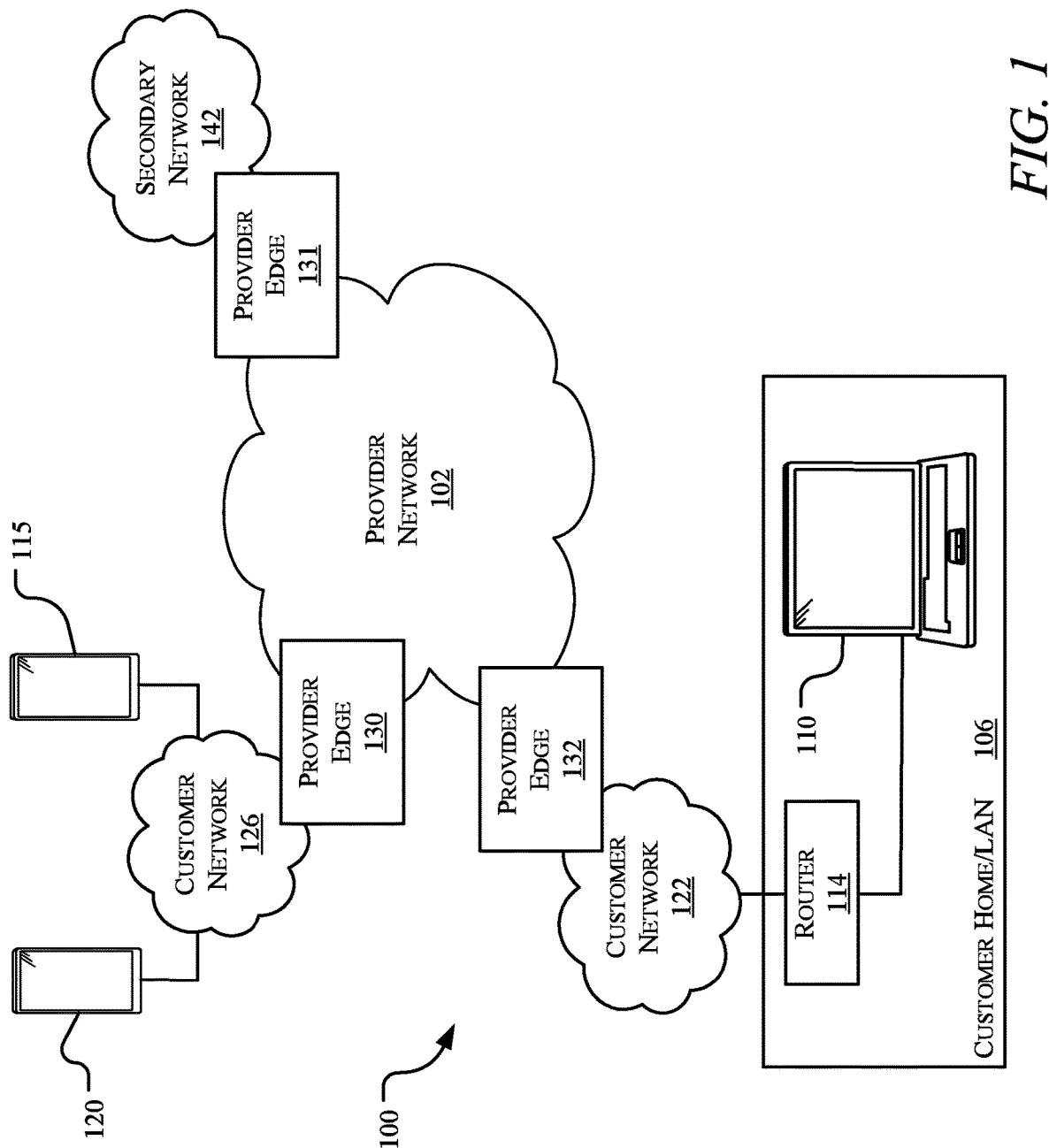
FIG. 1 shows a schematic diagram illustrating an exemplary network environment for mitigating network threats.

Aspects of the present disclosure involve systems, methods, computer program products, and the like, for receiving one or more distributed denial of service (DDOS) mitigation rules from a customer network and implementing the received rules on a provider edge device of a telecommunications network. In particular, a telecommunications network may connect to a customer network through one or more edge routing devices. The provider edge device, and in some instances a communication port through which the customer network communicates with the telecommunications network, may be configured to apply one or more rules associated with mitigating a DDOS attack on the customer network. Such rules may include dropping particular communication packets intended for the customer network if the routing information of the packet matches one or more routing parameters defined in the mitigation rule. In this manner, the telecommunications network edge device may apply a mitigation action of the mitigation rule to the communication packets intended for the customer network before such packets overload the customer network.

In one particular aspect, the DDOS mitigation rule may be received at the provider edge device from the customer network. For example, the customer network may announce the mitigation rule through a signaling protocol announcement. The announcement may be received at the provider edge device of the network and stored and implemented by the provider edge device on communications to the customer network. The provider edge device may be configured prior to receiving the DDOS mitigation rule to accept such rules from the customer network, for example, by a network administrator. The provider edge device may also be configured to apply one or more constraints to the types and/or number of DDOS mitigation rules that can be implemented by the provider edge device for the customer network. For example, the provider edge device may restrict rules accepted by the customer network to those that define a destination address that belongs to or is otherwise associated with the customer network. This may prevent a DDOS mitigation rule from affecting other customer networks connected to the provider edge device. In another example, the provider edge device may limit the number of mitigation rules that may be implemented on the provider edge device for the customer network. In still another instance, the mitigation rules received from the customer network may be applied on a port or interface level, rather than being applied globally to each port of the provider edge device. In this manner, a network administrator may provide various levels of DDOS mitigation services to customers of the telecommunications network and configure a provider edge device of the network through which the customer connects according to a level of service purchased by the customer.

Typically, DDOS mitigation rules broadcast from a DDOS mitigation announcement device are propagated to every component of a network to disperse the defense against the attack throughout the network. However, as some telecommunication networks may provide services to thousands of customers, such networks may prevent announced DDOS mitigation rules from a customer network to be broadcast throughout the telecommunications network (as such rules would quickly overwhelm the devices of the network). Stopping the implementation of the DDOS mitigation rules for a customer network at a network edge reduces the dispersal of the DDOS attack defense. Thus, some implementations of the systems and methods described herein may accept such DDOS mitigation rule announcements at a provider edge device, but prevent any other broadcast of the rule within the telecommunications network. This may aid the customer network in defending against the DDOS attack by preventing malicious packets from reaching the customer network while also limiting the impact on remaining portions of the telecommunications network. Further, the announcement and implementation of DDOS mitigation rules from a customer network may occur automatically in response to a detected DDOS attack thereby removing a need for a customer to manually contact a network administrator during an attack to implement one or more of the mitigation rules in the telecommunications network. This not only improves the speed of response of the customer network to a potential DDOS attack but may also reduce the cost and any inefficiency of the attack response protocol.

To begin a discussion of an example network environment 100 for mitigating network threats, reference is made to FIG. 1. In one implementation, a provider network 102 is in communication with various other networks, including a secondary network 142 and customer networks 122 and 126. The provider network 102 is a large provider that facilitates communication and exchanges traffic among the secondary network 142 and the customer networks 122 and 126. The customer networks 122 and 126 may be wired or wireless networks under the control of or operated/maintained by one or more entities, such as an Internet Service Provider (ISP) or Mobile Network Operator (MNO), that provide access to the provider network 102. Thus, for example, the customer networks 122 and 126 may provide Internet access to one or more end users. The secondary network 142 may be, for example, a Content Delivery Network. Although two customer networks and one secondary network are shown in the network environment 100, more or fewer customer and/or secondary networks may interface with the provider network 102. Further, the provider network 102, the customer networks 122 and 126, and the secondary network 142 are exemplary only. The presently disclosed technology may be applicable to any configuration of telecommunications network and/or any telecommunications network environment. The provider network 102 may implement a Voice over Internet Protocol (VoIP) environment. However, portions of the provider network 102 may include non-Internet Protocol (IP)-based routing. For example, network 102 may include devices utilizing time division multiplexing (TDM) or plain old telephone service (POTS) switching.

The provider network 102 includes multiple ingress/egress routers, which may have one or more ports, in communication with the secondary network 142 and the customer networks 122 and 126. For example, the edge router 131 of the provider network 102 interfaces with an edge router of the secondary network 142, and the edge routers 130 and 132 of the provider network 102 interface with edge devices of the customer networks 122 and 126, respectively. The edge devices 130 and 132 are network devices that provide entry points into the provider network 102 via the customer networks 122 and 126. Stated differently, one or more end users may connect to the Internet with a user device 110, 115, or 120 using one of the edge devices 130 or 132 via components of the customer networks 122 or 126. One or more customer home or business local area networks (LANs) 106, where a user of the network will connect with the provider network 102 via the customer network 122 with the user device 110 connected to a router 114. In another example, the user devices 115 and 120 access, and are accessed by, the provider network 102 via the customer network 126, which may be a public switched telephone network (PSTN) operated by a local exchange carrier (LEC).

The user device 110, 115, and 120 may be any form of computing device, including, without limitation, a personal computer, a terminal, a workstation, a mobile phone, a mobile device, a tablet, a set top box, a multimedia console, a television, an Internet of Things (IOT) device, or the like. In some implementations, the edge routers 130-132 communicate with each other across the provider network 102 over multiple iterations and hops of other routers contained within the provider network 102. Similarly, the customer networks 122 and 126 and/or the secondary network 142 may include edge routers that communicate with other routers via one or more hops and interface with another network, gateway, end user, or the like.

An operator of the provider network 102 may configure the network in any manner to facilitate the routing of communications through the network 102. For example, the network 102 may include a series of interconnected networking devices, such as routers and switches, that receive a communication, analyze the communication to determine a destination, and route the communication to a connected networking device to get the communication closer to a destination or egress point (such as provider edge 131). To determine which routes through the network to utilize to route a received communication or packet, components of the network 102 may receive route information through one or more route announcing sessions between the devices. These route announcing sessions provide routing information between the components of the network 102 and between different networks so that components of the Internet and other networks may determine how to route received communication packets.

One particular example of the announcement of routing information occurs in a Border Gateway Protocol (BGP) announcement. In general, BGP information (or BGP session, BGP feed or BGP data) is a table of Internet Protocol (IP) prefixes which designate network connectivity between autonomous systems (AS) or separate networks. BGP information for a network route may include path (including next-hop information), network policies, and/or rule-sets for transmission along the path, among other information. The BGP feed may also include Interior Gateway Protocol (IGP) information for network routes within an AS or network and/or other network information that pertains to the transmission of content from the network. However, as described below, BGP information mainly describes routes used by the network 102 to connect to external networks or customers (such as networks 122, 142) while IGP information describes routes through the network to connect one provider edge (such as provider edge 132) to another provider edge (such as provider edge 131) through the provider network 102.

One or more of the components of the network 102 may announce through a BGP session or other routing protocol announcement or advertisement routes serviced by that component. For example, provider edge device 132 may provide a BGP announcement to other components in the network 102 that indicates which networks (such as customer network 122) that may be accessed through the provider edge 132. Thus, the BGP announcement for provider edge 132 may include a path and next-hop information that designates a path along which packets may be transmitted or received from the connected networks (such as customer network 122). The next-hop information generally identifies a particular device of the network 102 through which a destination device or address is available. For example, a particular IP address associated with a customer of the network 102 or customer network 122 that is accessible through the customer network 122 may be announced from provider edge 132 to provider edge 131 of the network 102 (and vice versa). Although discussed herein as BGP announcements or advertisements, it should be appreciated that the routing protocol advertisements may be either or both BGP routes between networks and IGP routes through the provider network 102.

Other information may also be announced through BGP announcements. For example, through one or more supported portions of BGP announcements, parameters of a DDOS mitigation rule may be announced between network components or devices. These mitigation rules may define parameters of a communication packet that has the potential to be part of a malicious DDOS attack on a customer network or device. For example, the DDOS mitigation rule announcement may include a source IP address that has been identified as being the source of a DDOS attack. The rule may then instruct, through the announcement, a networking device to route a packet with the identified source IP address to a scrubbing environment of the network (to analyze and remove malicious packets), to a black hole router (to terminate the packet), or to simply drop the packet when received. Other attributes of the communication packet may also be announced as parameters for a DDOS mitigation rule, such as destination IP address, source port, destination port, communication protocol, and the like. Further, the DDOS mitigation rule announced through the BGP session may include any instruction for mitigating a potentially malicious packet, including but not limited to dropping the packet, re-routing the packet, and/or rate throttling packets to an attacked network. In general, the DDOS mitigation rule announcement through BGP provides instructions for responding to a DDOS attack based on packet parameters or other routing information included in the packet.

Figure 2:
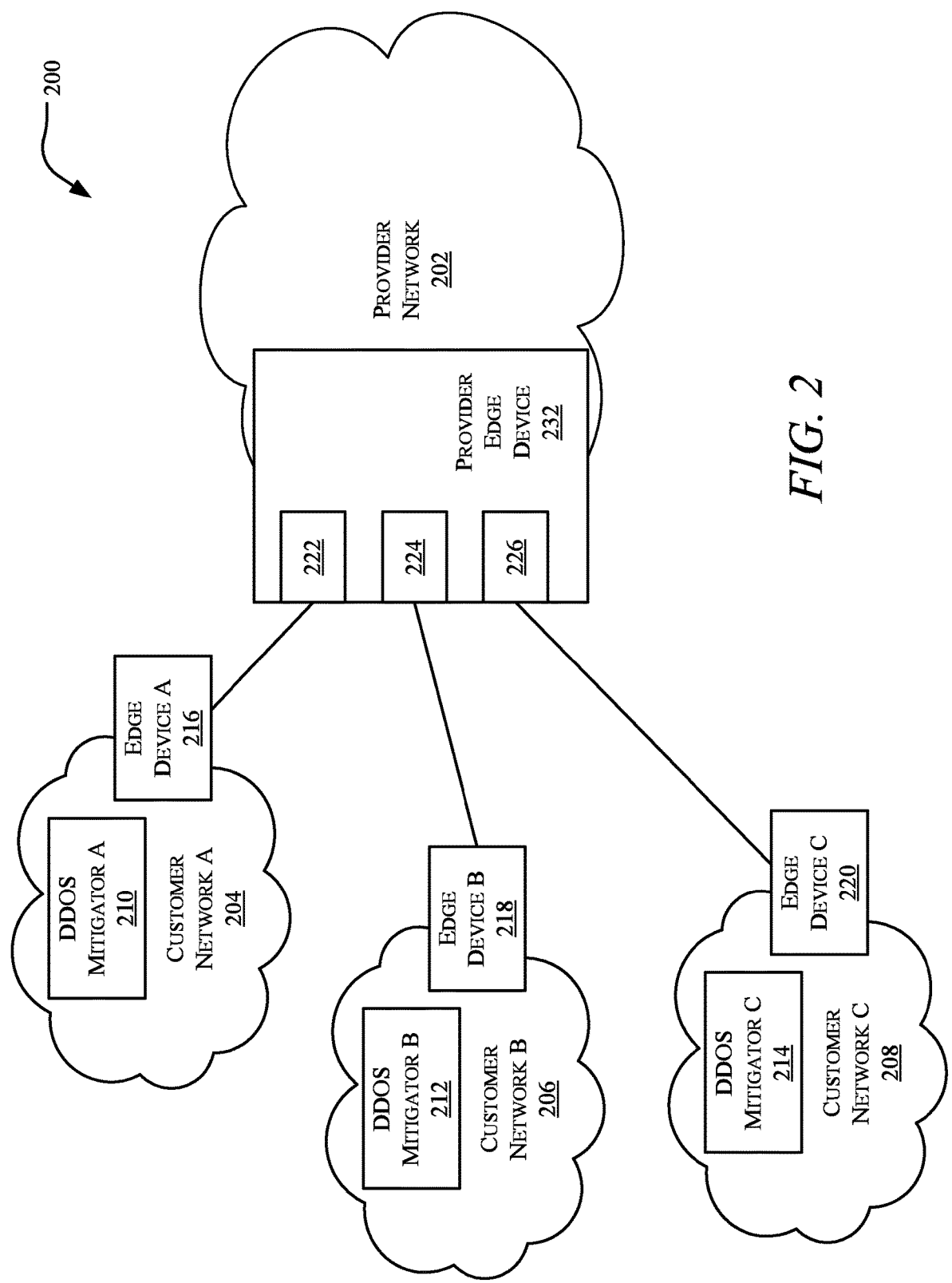
FIG. 2 is a schematic diagram illustrating an exemplary network environment for receiving one or more distributed denial of service (DDOS) mitigation rules from customer networks to a telecommunications network for implementation at a provider edge device of the network.

Turning to FIG. 2, an exemplary network environment 200 for receiving one or more DDOS mitigation rules from customer networks 204-208 at a telecommunications network 202 for implementation at an edge router 232 of the network 202 is shown. Components of the network environment 200 of FIG. 2 are similar to those discussed above with reference to FIG. 1, including the provider network 202, the provider edge device 232, and customer network A 204. In this example, however, several customer networks (namely customer network A 204, customer network B 206, and customer network C 208) are connected to the provider network 202. Each customer network 204-208 includes a customer edge device 216-220 that connects to the provider edge device 232 of the provider network 202 for exchanging communication packets between the networks. In particular, each network 204-208 connects to a communication port 222-226 of the provider edge device 232 for exchanging communication packets between the networks. The customer networks 204-208 may utilize the provider network 202 to communicate with other devices connected to the network 202 through the Internet or other public network architecture.

Each customer network 204-208 connected to the provider network 202 may include a DDOS mitigator device 210-214 providing DDOS mitigation services. Utilizing customer network A 204 as an example, DDOS mitigator 210 is instantiated within customer network A. In general, DDOS mitigator 210 is a device that analyzes traffic within the customer network 204 to determine when the customer network 204 or a device of the customer network 204 is under a DDOS attack. When an attack is determined through any known or developed analysis of network traffic, the DDOS mitigator 210 generates one or more DDOS mitigation rules to disperse the defense against the attack throughout the devices of customer network A 204. Thus, as part of the DDOS mitigator service, one or more mitigation rules are announced or otherwise provided through the customer network A 204 and implemented on the routing devices of the network 204. This generation and announcement of DDOS mitigation rules may occur automatically by the device 210 upon detection of a DDOS attack on a portion of the network 204. In a similar manner, customer network B 206 and customer network C 208 may also have DDOS mitigation devices 212, 214. Although not illustrated in FIG. 2, provider network 202 may also include a DDOS mitigation service that operates in a similar manner as described.

Typically, the propagation of DDOS mitigation rules is confined to the network in which the rules are generated and do not cross into a new AS network. For example, although edge device A 216 may receive the DDOS mitigation rules from the mitigator A 210, the edge device 216 may be configured to not transmit the rules to provider network 202. Alternatively, provider edge device 232 of provider network 202 may be configured to deny a request for a BGP session with edge device A 216 of customer network A 204 to exchange DDOS mitigation rules through interface 222. This is done to prevent each customer network 204-208 connected to the provider network 202 from providing their own DDOS mitigation rules that are then transmitted to each networking or routing device within the provider network 202 and overloading or negatively affecting the performance of the provider network 202. However, by limiting the propagation of the generated DDOS mitigation rules to the network 204 in which the mitigator 210 resides, the scope of the defense against the DDOS attack is lessened.

Figure 3:
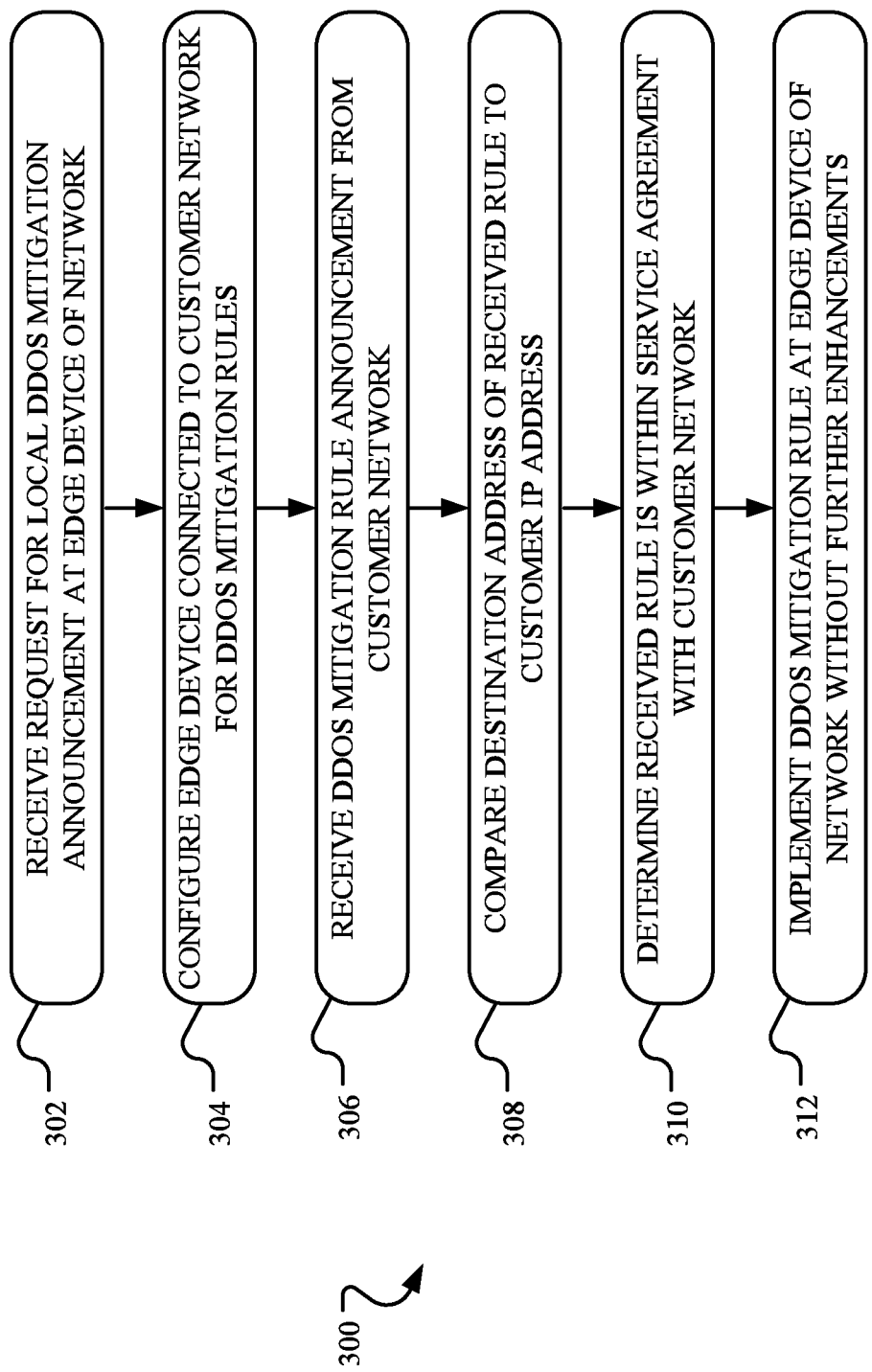
FIG. 3 is a flowchart illustrating example operations for implementing DDOS mitigation rules received from a customer network at a provider device of a telecommunications network.

Accordingly, to provide for a more robust response to a detected DDOS attack, edge device 232 of provider network 202 may be configured to receive and implement the DDOS mitigation attacks from connected customer networks 204-208. In particular, FIG. 3 is a flowchart illustrating example operations 300 for implementing DDOS mitigation rules received from a customer network 204-208 at a provider edge device 232 of a telecommunications network, such as the provider network 202. In general, the operations 300 may be performed by one or more components of the provider network 202, such as provider edge device 232, an operations center of the network 202, or an orchestrator of the network 202. Further, the operations 300 are described below with reference to the network environment 200 of FIG. 2, although the operations may be executed on any network configuration that is connected to one or more customer networks.

Beginning in operation 302, the network 202 receives a request from a customer network (such as customer network A 204) to allow for local DDOS mitigation rule propagation to the network 202. Such a request may occur through a service provided to the customer network 204 from a network administrator. For example, a network administrator may offer a local DDOS mitigation rule implementation service to an administrator of the customer network 204. In some instances, the offered service may include different classes or service agreements that provide more services or less services as desired by the customer network 204. The various classes of the service are discussed in more detail below. Also, one or more IP addresses associated with the customer network 204 may be provided or programmed into edge device 232 for use in applying DDOS mitigation rules. These destination IP addresses or other network addresses may be received during the initial request for local DDOS mitigation rule implementation.

Once the local DDOS mitigation rule implementation service is offered and elected by the customer network 204, one or more components or aspects of the provider network 202 may be configured to begin accepting DDOS mitigation rules announced by the customer network 204. For example, in operation 304, the edge device 232 to which the customer network 204 is connected or that otherwise provides access to the network 202 may be configured to begin receiving DDOS mitigation rules announced by the customer network 204. One particular configuration of provider edge device 232 may include configuring communication port 222 and the edge device to establish BGP sessions with edge device A 216 of customer network A 204 when DDOS mitigation rules are announced through the BGP sessions from customer network 204. In this manner, DDOS mitigation rules generated and broadcast by DDOS mitigator 210 of customer network A 204 may be transmitted to and received at the provider edge device 232 of provider network 202.

In addition to providing for establishing BGP sessions between customer edge device A 216 of customer network A 204 and provider edge device 232 of network 202, edge device 232 may also be configured to prevent further broadcasting of a received DDOS mitigation rule internally to other devices of network 202. By halting the propagation of the announced DDOS mitigation rule at the edge device 232, other routing devices within network 202 may not be overwhelmed as more and more such rules are announced and received at the network. However, implementing the DDOS mitigation rules on the edge device 232 of the network 202 may free up devices of the customer network 204 to implement other defenses against the attack without overwhelming the network devices. The edge device 232 may also be configured with one or more aspects of the service level purchased or requested by the customer network 204. For example, provider edge device 232 may have a limit on the number of DDOS mitigation rules that the edge device can implement at any one time. As such, the edge device 232 may limit the number of DDOS mitigation rules that a particular customer network 204 may implement on the edge device 232. The limitation on the DDOS mitigation rules may also be based on the service agreement between the network 202 and the customer network 204. Other aspects of the configuration of the edge device 232 may also be based on constraints of the network 202 and/or service agreements, including but not limited to the types of mitigation rules that may be implemented, the routing parameters that may be utilized to apply a rule to a packet, and/or a frequency or rate of providing new mitigation rules to the network 202 to avoid excessive processing of mitigation rules by a particular customer connected to the network.

In operation 306, provider edge device 232 may receive a DDOS mitigation rule from edge device A 216 of customer network A 204. As described above, a DDOS mitigator service 210 of customer network A 204 may detect a DDOS attack on one or more components of the customer network 204. In response, the mitigator 210 may generate a DDOS mitigation rule and propagate the rule to the devices of the customer network 204 and/or the provider edge device 232. For example, the mitigator 210 may determine that a DDOS attack is originating from a range of source IP addresses. Further, the level of the DDOS attack may indicate that a scrubbing service of the customer network 204 and/or the provider edge device 232 may mitigate those packets identified as part of the attack. In this circumstance, the mitigator 210 may generate a mitigation rule that defines routing parameters of communication packets of the attack, such as a destination IP address of the targeted device of customer network A 204 and a source IP address within the detected range of IP addresses. The propagated rule may instruct routing devices that receive the rule to re-route communication packets that match the routing parameters defined in the rule to a scrubbing device of customer network A 204. For more serious attacks, the rule may instruct routing devices to drop packets that match the parameters defined in the rule to ease the traffic transmitted to the targeted device. Other routing parameters that may be defined by the mitigation rule may include source port, destination port, communication protocol, and any other aspect of the communication packet. Also, the mitigation rule may include any action defined by the rule to aid in defending the targeted device or network from the DDOS attack.

Although previous network configurations limit the broadcast or announcement of DDOS mitigation rules to a single network, provider edge device 232 of network 202 may be configured to receive the announce DDOS mitigation rule through interface 222. Further, in operation 308, the edge device 232 may determine a destination IP address associated or defined within the routing parameters of the rule and compare the destination IP address for the rule with an IP address of the customer network A 204. For example, provider edge device 232 or a network administrator of network 202 may receive particular IP addresses associated with devices and networks of customer network A 204, such as example IP address 1.1.1.1. The network 202 may store the IP address 1.1.1.1 as being an known IP address associated with customer network A 204 during the request for the DDOS mitigation service. When the network 202 receives an announced DDOS mitigation rule, the rule may include a destination IP address parameter for packets intended for the targeted device or network. If the destination IP address in the routing parameters of the rule matches the known IP address for customer network A 204, the network 202 may determine that the mitigation is a valid rule for the customer network 204. This may prevent the mitigator 210 of customer network A 204 from providing one or more mitigating rules to provider edge device 232 that would drop or otherwise affect the routing of traffic to other customer networks 206-208 connected to the edge device 232. For example, a globally implemented mitigation rule to drop traffic from a particular source IP address may operate to drop legitimate traffic from that same IP address to customer network B 206 or customer network C 208. Thus, the edge device 232 may be configured to verify that a received mitigation rule from a customer network 204 only affects those packets intended for the customer network that announces the rule.

In operation 310, provider edge device 232 determines if the received mitigation rule from the customer network 204 is within a service agreement for the particular customer. As described above, an administrator of the customer network 204 may contract or otherwise purchase a service plan with an administrator of the provider network 202. The DDOS mitigation service plan may include any level of mitigation service, including services limiting the number and types of mitigation rules that may be implemented on provider edge device 232 at any one time. Thus, in one implementation, the edge device 232 may analyze the received rule to determine if the rule is within the type of allowed mitigation rules. Some agreements may not allow the mitigation rule to re-route packets matching the routing parameters to a scrubbing environment within the network 202 to prevent overloading the network 202. Thus, receiving such a mitigation rule from the customer network 204 may be ignored by the edge device 232. In another example, the customer network 204 may be prevented from providing a rate throttling mitigation rule on the edge device 232, as such as rule may be processing-intensive for the device 232 such that performance for other networks 206-208 connected to the edge device 232 would suffer. Thus, such rules that are outside the bounds of the service agreements may be discarded or ignored by the edge device 232. In yet another example, the customer network 204 may have allotted a maximum number of mitigation rules from the mitigator 210 of network 204 at provider edge device 232. Where this maximum number is exceeded, a new rule may be discarded or an older rule may be discarded based on the configuration of the edge device 232 of the network 202, among other possible responses.

Once the edge device 232 determines that the received DDOS mitigation rule from the customer network 204 both matches a destination IP address associated with customer network A 204 and is within a service level agreement between customer network 204 and network 202, in operation 312, the edge device 232 implements the DDOS mitigation rule on the edge device 232, without further broadcasting or propagating of the mitigation rule to other devices within the network 202. In this manner, one or more DDOS mitigation rules generated from the mitigator service 210 of the customer network 204 are propagated to edge device 232 of the prover network 202 and implemented at the edge device 232 to further expand the defense against the attack. This may prevent the link between the provider network 202 and the customer network 204 from becoming overloaded with lost traffic to the customer network 204. Further, the edge device 232 may prevent further broadcasting of the DDOS mitigation rule within the provider network 202 such that the network 202 itself is not overloaded with such mitigation rules. Even more, the entire process of announcing the DDOS mitigation rule from the mitigator 210 and implementation at the edge of the provider network 202 may occur automatically in response to a detected attack without the need for action by an administrator of the networks to establish the rule within the networks. In a similar manner, mitigation rules announced by customer network B 206 and customer network C 208 may also be received and implemented on edge device 232 to provide protection or defense against a DDOS attack at those networks.

Although discussed above with reference to the edge device 232, some implementations of the network 202 may implement a received DDOS mitigation rule on a particular interface 222, such as a port, of the edge device 232 such that a received rule does not affect traffic to other customer networks 206-208 connected to the same edge device 232. For example, a first mitigation rule received through an announcement session with customer network A 204 may be applied to interface 222 to filter or otherwise analyze DDOS traffic transmitted through interface 222. A second different mitigation rule received through an announcement session with customer network B 206 may be applied to interface 224 to filter or otherwise analyze DDOS traffic transmitted through interface 224. These rules may only apply to traffic transmitted through the particular interface associated with the rule-providing network to prevent a mitigation rule for a first customer network 204 affecting traffic or packets intended for a second customer network 206. In such an implementation, the edge device 232 may not determine if the received rule includes routing parameters of a destination IP address that matches an IP address for the network 204. Rather, because the implementation of the mitigation rule is already limited to the particular customer network 204 based on the particular port 222 through which communication with the network 202 occurs, the rule may mitigate packets based on source IP address or any other packet aspect without defining a particular destination IP address for the DDOS attack packets.

Figure 4:
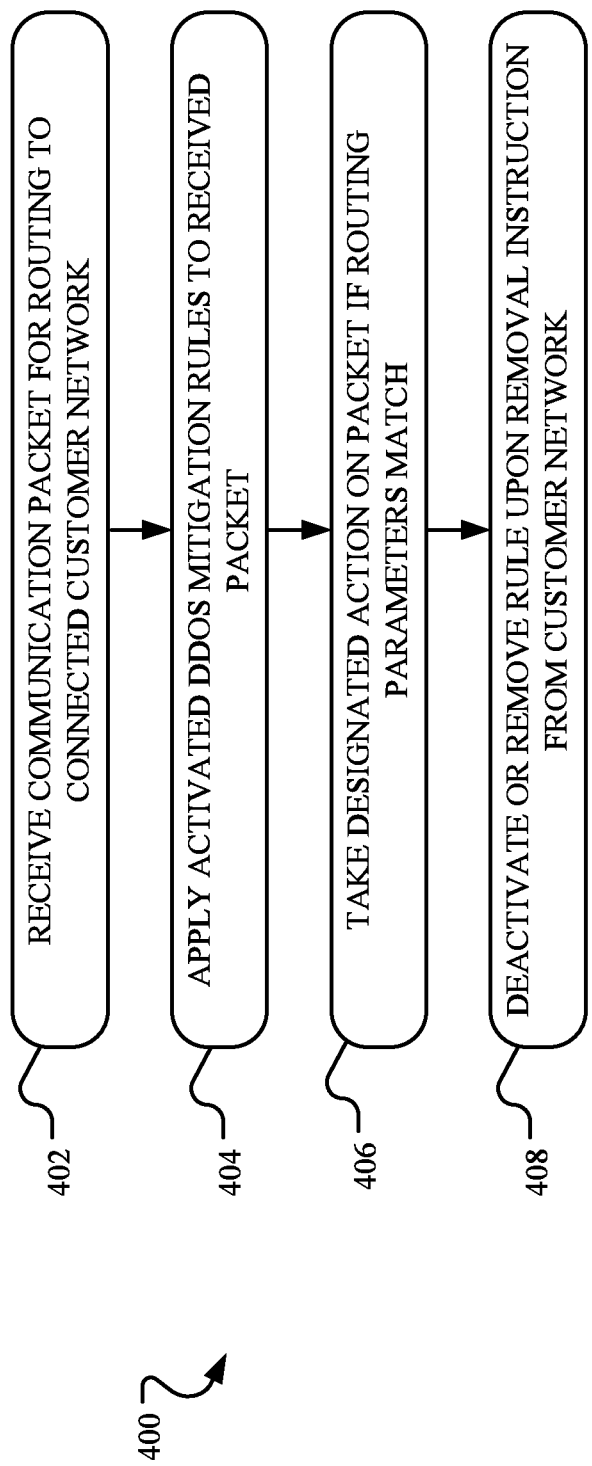
FIG. 4 is a flowchart illustrating example operations for applying a received DDOS mitigation rule from a customer network on a received communication packet intended for the customer network.

With the local DDOS mitigation rule implemented at the edge device 232 of the network 202, the edge device 232 may aid the customer network 204 in defending against a DDOS attack on the customer network 204 or a device of the customer network 204. In particular, FIG. 4 is flowchart illustrating example operations 400 for applying a received DDOS mitigation rule from a customer network 204 on a received communication packet intended for the customer network 204. In general, the operations 400 are performed by the network edge device 232 after a DDOS mitigation rule is implemented or installed on the edge device 232 and traffic or packets intended for the customer network 204 is transmitted through the edge device 232.

Beginning in operation 402, the edge device 232 may receive a packet with a destination IP address within customer network A 204 (or other connected customer networks, in other examples). The received packet may include routing information, such as a destination IP address, a source IP address, a destination port, a source port, and a communication protocol. In operation 404, the edge device 232 may apply one or more of the implemented DDOS mitigation rules to the received packet. In particular, the edge device 232 may compare the routing information of the received packet to the one or more routing parameters defined in the DDOS mitigation rule. If the routing information matches the routing parameters, the rule may be applied to the received packet. In one particular implementation, if the destination IP address of the packet matches a device or a portion of the customer network 204, the mitigation rule applies to the packet.

In operation 406, the edge device 232 executes the designated action of the mitigation rule on the packet if the parameters of the rule match the received packet. In one example, the action of the mitigation rule includes dropping the packet. In another example, the action includes re-routing the packet to one or more scrubbing devices or other DDOS attack remediation devices within network 202. After application of the rule to the received packet, the edge device 232 may return to receiving packets intended for the customer network 204 and apply the rule to those packets that meet the parameters of the rule. In operation 408, the edge device 232 may remove a rule from the edge device 232 when a removal instruction from the edge device 216 of the customer network 204 is received or when a BGP session with the customer edge device 216 is stopped. The removal of the mitigation rule may provide for additional mitigation rules to be implemented on the occurrence of another DDOS attack on the customer networks 204-208 connected to the edge device 232. In this manner, a received DDOS mitigation rule generated by a mitigator device 210-214 may be implemented on an edge device 232 of a network 202 to aid customer networks 204-208 in responding to a detected DDOS attack.

Figure 5:
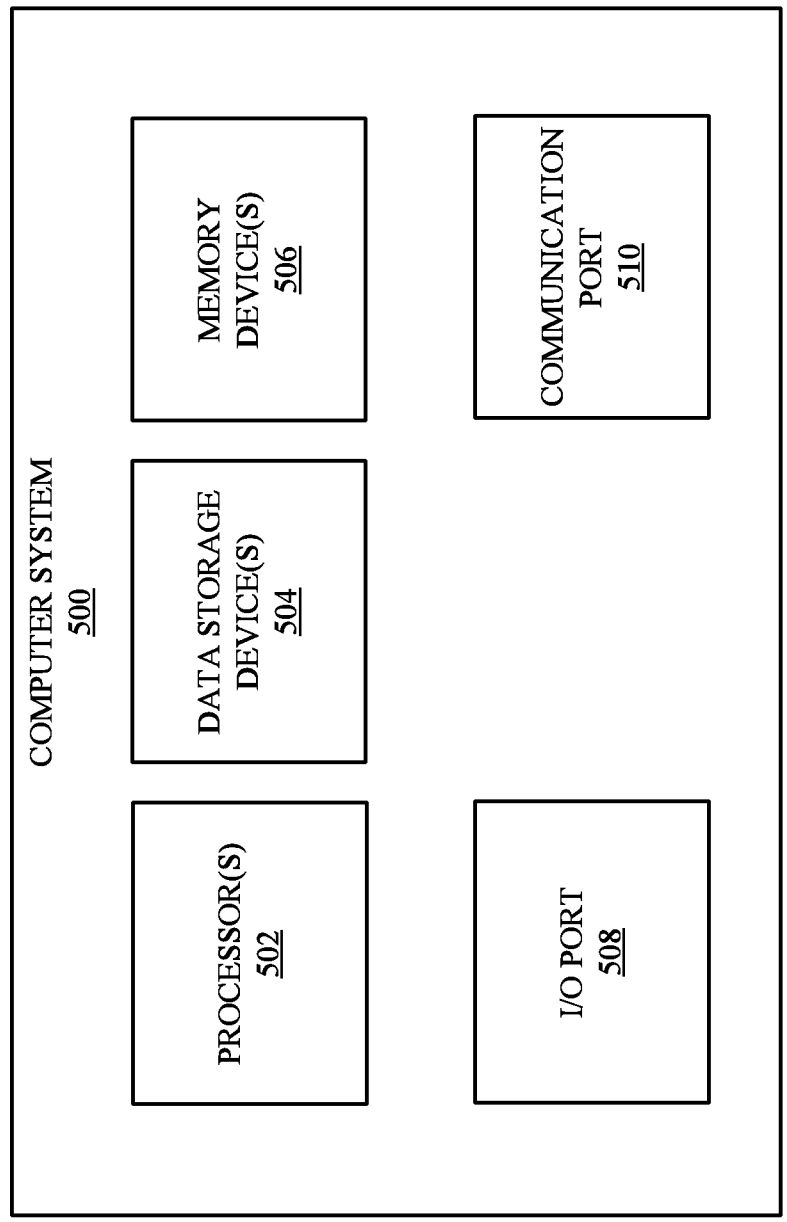
FIG. 5 is an example computing system that may implement various systems and methods discussed herein.

Referring to FIG. 5, a detailed description of an example computing system 500 having one or more computing units that may implement various systems and methods discussed herein is provided. The computing system 500 may be applicable to the edge devices and other computing or network devices. It will be appreciated that specific implementations of these devices may be of differing possible specific computing architectures not all of which are specifically discussed herein but will be understood by those of ordinary skill in the art.

The computer system 500 may be a computing system is capable of executing a computer program product to execute a computer process. Data and program files may be input to the computer system 500, which reads the files and executes the programs therein. Some of the elements of the computer system 500 are shown in FIG. 5, including one or more hardware processors 502, one or more data storage devices 504, one or more memory devices 506, and/or one or more ports 508-510. Additionally, other elements that will be recognized by those skilled in the art may be included in the computing system 500 but are not explicitly depicted in FIG. 5 or discussed further herein. Various elements of the computer system 500 may communicate with one another by way of one or more communication buses, point-to-point communication paths, or other communication means not explicitly depicted in FIG. 5.

The processor 502 may include, for example, a central processing unit (CPU), a microprocessor, a microcontroller, a digital signal processor (DSP), and/or one or more internal levels of cache. There may be one or more processors 502, such that the processor 502 comprises a single central-processing unit, or a plurality of processing units capable of executing instructions and performing operations in parallel with each other, commonly referred to as a parallel processing environment.

The computer system 500 may be a conventional computer, a distributed computer, or any other type of computer, such as one or more external computers made available via a cloud computing architecture. The presently described technology is optionally implemented in software stored on the data stored device(s) 504, stored on the memory device (s) 506, and/or communicated via one or more of the ports 508-510, thereby transforming the computer system 500 in FIG. 5 to a special purpose machine for implementing the operations described herein. Examples of the computer system 500 include personal computers, terminals, workstations, mobile phones, tablets, laptops, personal computers, multimedia consoles, gaming consoles, set top boxes, and the like.

The one or more data storage devices 504 may include any non-volatile data storage device capable of storing data generated or employed within the computing system 500, such as computer executable instructions for performing a computer process, which may include instructions of both application programs and an operating system (OS) that manages the various components of the computing system 500. The data storage devices 504 may include, without limitation, magnetic disk drives, optical disk drives, solid state drives (SSDs), flash drives, and the like. The data storage devices 504 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 506 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 504 and/or the memory devices 506, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 500 includes one or more ports, such as an input/output (I/O) port 508 and a communication port 510, for communicating with other computing, network, or vehicle devices. It will be appreciated that the ports 508-510 may be combined or separate and that more or fewer ports may be included in the computer system 500.

The I/O port 508 may be connected to an I/O device, or other device, by which information is input to or output from the computing system 500. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 500 via the I/O port 508. Similarly, the output devices may convert electrical signals received from computing system 500 via the I/O port 508 into signals that may be sensed as output by a human, such as sound, light, and/or touch. The input device may be an alphanumeric input device, including alphanumeric and other keys for communicating information and/or command selections to the processor 502 via the I/O port 508. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 500 via the I/O port 508. For example, an electrical signal generated within the computing system 500 may be converted to another type of signal, and/or vice-versa. In one implementation, the environment transducer devices sense characteristics or aspects of an environment local to or remote from the computing device 500, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 500, such as, physical movement of some object (e.g., a mechanical actuator), heating or cooling of a substance, adding a chemical substance, and/or the like.

In one implementation, a communication port 510 is connected to a network by way of which the computer system 500 may receive network data useful in executing the methods and systems set out herein as well as transmitting information and network configuration changes determined thereby. Stated differently, the communication port 510 connects the computer system 500 to one or more communication interface devices configured to transmit and/or receive information between the computing system 500 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 510 to communicate one or more other machines, either directly over a point-to-point communication path, over a wide area network (WAN) (e.g., the Internet), over a local area network (LAN), over a cellular (e.g., third generation (3G) or fourth generation (4G)) network, or fifth generation (5G) network) or over another communication means. Further, the communication port 510 may communicate with an antenna or other link for electromagnetic signal transmission and/or reception.

In an example implementation, mitigation rules and software and other modules and services may be embodied by instructions stored on the data storage devices 504 and/or the memory devices 506 and executed by the processor 502. The computer system 500 may be integrated with or otherwise form part of the edge devices.

The system set forth in FIG. 5 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for mitigating network threats, the method comprising:
   determining a service level agreement between a customer network and a telecommunications network;
   configuring a provider edge device of the telecommunications network to accept distributed denial of service mitigation rule propagation from a customer edge device of the customer network in communication with the provider edge device;

receiving a distributed denial of service mitigation rule for the customer network at the provider edge device from the customer edge device, the distributed denial of service mitigation rule including one or more routing parameters and a mitigation action;

determining whether the denial of service mitigation rule is permitted to be implemented on the provider edge device according to the service level agreement;

implementing, when the denial of service mitigation rule is permitted according to the service level agreement between the customer network and the telecommunications network, the distributed denial of service mitigation rule, locally on the provider edge device of the telecommunications network, to apply to network traffic being sent to the provider edge device and destined for the customer edge device; and preventing a broadcasting of the distributed denial of service mitigation rule in the telecommunications network beyond the provider edge device.

2. The method of claim 1, wherein configuration of the provider edge device to accept distributed denial of service mitigation rule propagation includes storing at least one known Internet Protocol address associated with the customer network.

3. The method of claim 2, wherein the one or more routing parameters includes the at least one known Internet Protocol address as a destination Internet Protocol address routing parameter.

4. The method of claim 3, further comprising:
receiving a communications packet of a potential distributed denial of service attack at the provider edge device, the communications packet including a destination Internet Protocol address matching the destination Internet Protocol address routing parameter; and
executing the mitigation action of the communications packet at the provider edge device.

5. The method of claim 1, wherein configuration of the provider edge device to accept distributed denial of service mitigation rule propagation includes establishing a Border Gateway Protocol session between the customer edge device and the provider edge device.

6. The method of claim 1, wherein configuration of the provider edge device to accept distributed denial of service mitigation rule propagation includes applying a service level agreement parameter to the provider edge device for validating a distributed denial of service mitigation rule type for the customer network.

7. The method of claim 1, wherein the distributed denial of service mitigation rule is validated prior to implementation.

8. The method of claim 7, wherein validating the distributed denial of service mitigation rule includes at least one of: comparing a destination Internet Protocol address of the routing parameter to a known Internet Protocol address of the customer network; or determining whether the distributed denial of service mitigation rule is within a service level agreement between the customer network and the telecommunications network.

9. The method of claim 1, wherein the one or more routing parameters includes at least one of: a destination Internet Protocol address of a targeted device of the customer network; a source Internet Protocol address within a detected range; a source port, a destination port, a communication protocol, or a parameter defining a communications packet of a distributed denial of service attack.

10. The method of claim 1, wherein the mitigation action includes at least one of: rerouting a communications packet matching the one or more routing parameters to a scrubbing device of the customer network; dropping a communications packet matching the one or more routing parameters; or rate throttling a communications packet matching the one or more routing parameters.

11. The method of claim 1, wherein the distributed denial of service mitigation rule is received and implemented automatically in response to a detected distributed denial of service attack associated with the customer network.

12. The method of claim 1, wherein implementation of the distributed denial of service mitigation rule locally on the provider edge device includes limiting implementation of the distributed denial of service mitigation rule to traffic transmitted through an interface of the provider edge device associated with the customer network.

13. The method of claim 1, further comprising:
receiving a communications packet for routing to the customer network at the provider edge device, the communications packet including routing information;
comparing the routing information of the communications packet to the one or more routing parameters of the distributed denial of service mitigation rule; and
executing the mitigation action when the routing information of the communications packet matches the one or more routing parameters of the distributed denial of service mitigation rule.

14. The method of claim 1, wherein the distributed denial of service mitigation rule is removed from the provider edge device in response to a removal request from the customer network.

15. The method of claim 14, wherein the removal request includes removal instructions received at the provider edge device from the customer edge device.

16. The method of claim 14, wherein the removal request includes a termination of a Border Gateway Protocol session between the customer edge device and the provider edge device.

17. One or more non-transitory tangible computer-readable storage media storing computer-executable instructions for performing a computer process on a computing system, the computer process comprising:
determining a service level agreement between a first telecommunications network and a second telecommunications network;
configuring a first edge device of the first telecommunications network to accept distributed denial of service mitigation rule propagation from a second edge device of the second telecommunications network in communication with the first edge device;
receiving a distributed denial of service mitigation rule for the second telecommunications network at the first edge device from the second edge device, the distributed denial of service mitigation rule including one or more routing parameters and a mitigation action;
determining whether the denial of service mitigation rule is permitted to be implemented on the first edge device according to the service level agreement;
implementing, when the denial of service mitigation rule is permitted according to the service level agreement between the first telecommunications network and the second telecommunications network, the distributed denial of service mitigation rule locally on the first edge device of the first telecommunications network, to apply to network traffic being sent to the first edge device and destined for the second edge device; and preventing a broadcasting of the distributed denial of service mitigation rule in the first telecommunications network beyond the first edge device.

18. The one or more non-transitory tangible computer-readable storage media of claim 17, further comprising:

receiving a communications packet for routing to the second telecommunications network at the first edge device, the communications packet including routing information; comparing the routing information of the communications packet to the one or more routing parameters of the distributed denial of service mitigation rule; and executing the mitigation action when the routing information of the communications packet matches the one or more routing parameters of the distributed denial of service mitigationrule.

19. A system for mitigating network threats, the system comprising:

a customer edge device deployed in a customer network;

a distributed denial of service mitigator in communication with the customer edge device, the distributed denial of service mitigator broadcasting a distributed denial of service mitigation rule to the customer edge device in response to a distributed denial of service attack detected for targeting the customer network; and a provider edge device deployed in a telecommunications network and in communication with the customer edge device, the provider edge device configured to accept distributed denial of service mitigation propagation from the customer edge device, the provider edge device receiving the distributed denial of service mitigation rule from the customer edge device, determining whether the denial of service mitigation rule is permitted to be implemented on the provider edge device according to a service level agreement, and implementing, when the denial of service mitigation rule is permitted according to the service level agreement between the customer network and the telecommunications network, the distributed denial of service mitigation rule, locally on the provider edge device, to apply to network traffic being sent to the provider edge device and destined for the customer edge device, the distributed denial of service mitigation rule is prevented from being broadcasted in the telecommunications network beyond the provider edge device.

20. The system of claim 19, wherein the provider edge device receives and implements the distributed denial of service mitigation rule automatically.

* * * * *